(12) United States Patent
Forstner et al.

(10) Patent No.: US 12,378,742 B2
(45) Date of Patent: Aug. 5, 2025

(54) UNBALANCE EXCITER FOR VIBRATORY PLATES

(71) Applicant: Wacker Neuson Produktion GmbH & Co. KG, Reichertshofen (DE)

(72) Inventors: Florian Forstner, Rudelzhausen (DE); Tobias Müller, Margetshöchheim (DE); Walter Unverdorben, Markt Indersdorf (DE); Lisa Weber, Seefeld (DE)

(73) Assignee: Wacker Neuson Produktion GmbH & Co., Reichertshofen (DE)

( * ) Notice: Subject to any disclaimer, the term of this patent is extended or adjusted under 35 U.S.C. 154(b) by 353 days.

(21) Appl. No.: 17/587,435

(22) Filed: Jan. 28, 2022

(65) Prior Publication Data
US 2022/0243416 A1    Aug. 4, 2022

(30) Foreign Application Priority Data
Feb. 2, 2021    (DE) ...................... 10 2021 102 346.7

(51) Int. Cl.
| | | |
|---|---|---|
| *E02D 3/074* | (2006.01) | |
| *H02K 7/00* | (2006.01) | |
| *H02K 7/08* | (2006.01) | |
| *H02K 7/14* | (2006.01) | |
| *H02K 1/12* | (2006.01) | |

(52) U.S. Cl.
CPC ............. *E02D 3/074* (2013.01); *H02K 7/003* (2013.01); *H02K 7/08* (2013.01); *H02K 7/14* (2013.01); *H02K 1/12* (2013.01)

(58) Field of Classification Search
CPC ......... E01C 19/38; E02D 3/074; H02K 7/003; H02K 7/08; H02K 7/14; H02K 1/12; H02K 7/061; B06B 1/16
See application file for complete search history.

(56) References Cited

U.S. PATENT DOCUMENTS

| | | | |
|---|---|---|---|
| 4,389,137 A | 6/1983 | Riedl | |
| 4,643,611 A * | 2/1987 | Pilachowski | ........... E02D 3/074 74/61 |

(Continued)

FOREIGN PATENT DOCUMENTS

| | | |
|---|---|---|
| DE | 19 32 414 | 2/1966 |
| DE | 12 45 188 | 7/1967 |

(Continued)

*Primary Examiner* — Carib A Oquendo
(74) *Attorney, Agent, or Firm* — Boyle Fredrickson, S.C.

(57) ABSTRACT

An unbalance exciter for a vibratory plate includes a rotatably mounted unbalance shaft, on which an unbalance mass is provided. The exciter includes an exciter housing for the unbalance shaft, at least two bearing devices for the rotatable mounting of the unbalance shaft, and two bearing seats for the bearing devices. The exciter housing has a central part and two end parts arranged at the ends of the central part. The central part has a hollow-cylindrical recess in which a bearing point is provided for each of the bearing devices. The the central part is designed to optionally accommodate an unbalance shaft for either a first drive type in which the unbalance exciter can be driven by a drive device provided outside the exciter housing, or a second drive type in which the unbalance exciter can be driven by a drive device provided inside the exciter housing.

12 Claims, 3 Drawing Sheets

(56) References Cited

U.S. PATENT DOCUMENTS

| | | | | |
|---|---|---|---|---|
| 5,890,834 | A | * | 4/1999 | Waldenberger ......... E01C 19/38 404/133.05 |
| 2004/0005191 | A1 | * | 1/2004 | Geier ...................... E02D 3/026 29/898.07 |
| 2011/0290048 | A1 | * | 12/2011 | Stein ..................... E01C 19/286 74/61 |
| 2021/0172142 | A1 | * | 6/2021 | Ivanov ................... E01C 19/38 |
| 2022/0010505 | A1 | * | 1/2022 | Glanzer ................ H02K 7/063 |

FOREIGN PATENT DOCUMENTS

| | | | |
|---|---|---|---|
| DE | 10218213 | A1 | 11/2003 |
| WO | 2006001230 | A1 | 1/2006 |

* cited by examiner

UNBALANCE EXCITER FOR VIBRATORY PLATES

BACKGROUND OF THE INVENTION

1. Field of the Invention

The invention relates to an unbalance exciter for vibratory plates and to a vibratory plate equipped with such an unbalance exciter for ground compaction.

2. Description of the Related Art

Vibratory plates, frequently also designated vibration or ground compaction plates, are known and are used, amongst other things, for ground compaction. A ground contact plate is set vibrating by an unbalance exciter, the vibrations then being introduced into the ground for the compaction. The ground contact plate and the unbalance exciter located thereon form a so-called lower mass, which is connected to an upper mass via a vibration decoupling device (for example a rubber buffer) and is movable relative thereto. A drive, for example an internal combustion engine or an electric motor, can be provided on the upper mass. Likewise, a guide device, for example a guide handle for an operator to guide the vibratory plate, can be attached to the upper mass.

The unbalance exciter usually has an unbalance shaft, on which an unbalance mass is provided eccentrically so that, during the rotation of the unbalance shaft, corresponding vibrations are generated, so that the resultant forces can be introduced into the ground.

Likewise known are unbalance exciters in which two or more unbalance shafts are provided. Frequently, use is made of so-called two-shaft exciters, in which there are two unbalance shafts parallel to each other and rotating in opposite directions. The rotational movement of the two unbalance shafts can be coupled to each other, for example by a gear connection (spur gear transmission).

The drive of the unbalance shaft—or in the case of a two-shaft exciter of one of the two unbalance shafts—in devices with an internal combustion engine is frequently provided via a centrifugal force clutch and a belt drive, which transmits the torque from the internal combustion engine usually present on the upper mass to the unbalance exciter on the lower mass. For this purpose, pulleys are provided on the upper mass and on the lower mass (unbalance shaft), over which pulleys the belts belonging to a belt drive, in particular a V belt, can be guided.

Alternatively, it is also known that the unbalance shaft is driven directly by an electric motor which, together with the unbalance shaft, is accommodated in the same housing.

For the variants with an electric drive and with an internal combustion engine, different parts must be developed, fabricated and kept in store during production for the unbalance exciter. In addition, the periphery of the overall devices must be matched to the various variants. Changes to one part can in certain circumstances be accompanied by far-reaching changes on further parts of the device. In addition, the assembly becomes more complex and more time-consuming as a result of the wealth of variants. Therefore, the manufacturing costs also rise.

SUMMARY OF THE INVENTION

The invention is based on the object of simplifying the construction of such an unbalance exciter for a vibratory plate to the extent that the multiplicity of components is reduced despite an existing wealth of variants because of different drive variants of a vibratory plate.

According to the invention, the object is achieved in that an unbalance exciter having an exciter housing is specified, which can be operated both with a mechanically driven unbalance shaft and with an internally electrically driven unbalance shaft.

In particular, the object is achieved by an unbalance exciter having the features of claim 1. The unbalance exciter, used as a universal exciter, i.e. for various variants, can advantageously be used in a vibratory plate for ground compaction. Advantageous refinements of the invention are specified in the dependent claims.

An unbalance exciter for a vibratory plate for ground compaction is specified, comprising at least one rotatably mounted unbalance shaft, on which an unbalance mass is provided to generate an unbalance: comprising an exciter housing which at least partly surrounds the unbalance shaft; and comprising at least two bearing devices for the rotatable mounting of the unbalance shaft in the exciter housing; wherein the unbalance shaft has two bearing seats, on which bearing devices support the unbalance shaft; wherein the exciter housing has a central part, the exciter housing has two end parts arranged at the end of the central part; wherein the central part has a hollow-cylindrical recess, in which a bearing point is provided for each of the bearing devices; wherein the central part is designed to optionally accommodate an unbalance shaft for one of two different drive types; wherein a first drive type is provided, in which the unbalance exciter can be driven by a drive device provided outside the exciter housing of the unbalance exciter; and wherein a second drive type is provided, in which the unbalance exciter can be driven by a drive device provided inside the exciter housing of the unbalance exciter.

The unbalance exciter thus has an exciter housing with a central part, on each end of which an end part, for example a cover part, is provided. The central part can have a tubular design with its hollow-cylindrical recess. In addition to the central part and the two end parts (cover parts), still further components can be provided as parts of the exciter housing, for example intermediate pieces or intermediate sleeves.

In an unbalance exciter having two unbalance shafts, the central part can correspondingly have a further hollow-cylindrical recess. Alternatively, a further central part having a hollow-cylindrical recess can be provided to accommodate the second unbalance shaft. In this variant, the two central parts can then also be formed by a one-piece common central part.

The exciter housing is configured in such a way that it can be populated for two different drive types. According to a first drive type, the unbalance exciter having the exciter housing can be driven by a drive device provided outside the unbalance exciter, for example an internal combustion engine.

According to a second drive type, a drive device, for example an electric motor which drives the unbalance exciter, can alternatively also be accommodated in the interior of the exciter housing.

Thus, according to the invention, a type of modular system is proposed, in which an exciter housing that is identical in substantial components (central part) can be used for unbalance exciters with various designs or constructional principles By means of the configuration of the exciter housing, in particular of the central part of the exciter housing, it is possible that the exciter housing can be used universally for the various drive types and designs of the unbalance shafts without constructive or constructional measures having to be taken on the central part of the exciter housing. In this way, it is sufficient for the manufacturer to produce only one type of central part for the unbalance exciter according to the invention, which central part can be used for different applications.

The end parts or cover parts can also be used uniformly. Here, however, it may also be expedient to provide different end and cover parts for the different drive types and unbalance shaft designs.

The unbalance exciter can be fixed in a manner known per se to the upper side of a ground contact plate, in order to introduce the vibrations generated by the exciter into the ground to be compacted via the ground contact plate. For this purpose, the unbalance exciter can be screwed to the ground contact plate, for example via the exciter housing. In one variant, the exciter housing—or in particular the central part of the exciter housing—and ground contact plate can also be produced as a one-piece component, for example in the form of a casting.

Between the two bearing points and therefore between the two bearing devices it is possible to form a central installation space, wherein the central part can be designed to accommodate optionally one of two different designs of unbalance shaft, corresponding to the selected drive type, namely for the first drive type, a first unbalance shaft design in which the unbalance mass is provided in the central installation space between the two bearing seats and in which the unbalance shaft has a shaft extension outside the central installation space, via which the unbalance shaft can be driven by a drive provided outside the exciter housing or, for the second drive type, a second unbalance shaft design, in which the unbalance mass is arranged outside the central installation space and in which an electric motor is provided inside the central installation space as a drive for the unbalance exciter.

In the first drive type or the first unbalance shaft design, the unbalance shaft is intended to be driven by a drive provided outside the exciter housing. In order to permit this, the unbalance shaft has a shaft extension projecting out of the exciter housing, via which the unbalance shaft can be driven. A suitable torque transmission device can be provided on the shaft extension to introduce a drive torque from the drive. Suitable for this purpose are, for example, a belt pulley or a V belt pulley, via which the drive, for example an internal combustion engine or an electric motor which is provided outside the unbalance exciter, can drive the unbalance shaft in rotation.

In the second drive type or the second unbalance shaft design, the drive is integrated in the unbalance exciter in the form of the electric motor. Here, space must be found for the electric motor in the central installation space in the interior of the central part.

In the second unbalance shaft design, a respective shaft extension, on which a respective partial unbalance mass can be arranged, can be formed on the unbalance shaft on both end sides. In this case, the unbalance mass can be divided into two partial unbalance masses, which can each be arranged on the lengthened end portions of the unbalance shaft. These lengthened portions or shaft extensions do not have to project to the outside on the exciter housing but can remain in the interior of the exciter housing or be covered by appropriate cover parts.

In the second unbalance shaft design, the electric motor can have a rotor, which can be arranged in a region between the two bearing seats on the unbalance shaft. The rotor of the electric motor is in this case fixed directly to the unbalance shaft, which, firstly, permits a particularly compact construction and, secondly, a direct drive of the unbalance shaft.

In the second unbalance shaft design, the electric motor can have a stator, which is inserted into the central part in a region between the two bearing points. In this way, the stator can be fixed directly in the exciter housing without further parts being required. It is possible, for example, that the stator is pressed directly axially into the central part and therefore the exciter housing, in order to mount the stator with the least possible effort.

At least one sub-region having a conical taper can be provided in the region of the central part between the two bearing points. Accordingly, this sub-region extends conically or in a tapering manner, in order that the stator can be pressed in from the side having the larger diameter. The conical taper represents a slight deviation as compared with the otherwise hollow-cylindrical recess in the central part.

The stator can thus be pressed into the region of the central part between the two bearing points, wherein a mounting stop can be provided in the region of the central part between the two bearing points. The mounting stop can be used to position the stator. It is either possible that the stator is pressed against the mounting stop and thus reaches its intended position. Likewise, it is possible that a pressing tool, with which the stator is pressed into the central part, is pressed against the mounting stop, so that the position of the pressing tool is defined, from which a defined position of the stator also results.

In the second drive type, a terminal device can be arranged on the outer side of the central part for feeding electric lines to the stator of the electric motor. In this case, for the specific case of the second drive type, an additional hole in the central part is required in order to be able to carry power to the electric drive in the interior of the central part. In particular, a power line, which is led through the hole, must then be guided to the stator.

Since, however, such a hole can in principle be made very easily and needs no further configuration changes, this additional work is readily acceptable.

Thus, the exciter housing for both drive variants is identical. Only for the drive by electric motor can a hole for the cables of the electric motor still be provided.

Identical bearing devices can be provided for both unbalance shaft designs. Thus, no different bearing devices have to be provided by the manufacturer for the two drive types either.

The variants that are described are suitable in particular for a so-called single-shaft exciter, in which the unbalance force is generated by a single rotating unbalance shaft.

However, the variants are also suitable for a two-shaft exciter or a multi-shaft exciter, in which two or more unbalance shafts rotating in an exciter housing are provided.

In addition, in such an exciter having two unbalance shafts, for example, the exciter housing can accordingly be configured in such a way that it is likewise suitable for the first and the second drive type. In this case, one of the unbalance shafts is thus suitable to be driven by a drive device provided outside the exciter housing, in particular by a belt drive driven by an electric motor or internal combustion engine. For the alternative second drive type, this unbalance shaft can also be driven by an electric motor provided inside the exciter housing.

The driven (first) unbalance shaft can in turn drive the second unbalance shaft. For this purpose, the first and the second unbalance shaft can be coupled to each other, for example by a spur gear transmission, in order, for example, to effect an opposite rotational movement of the two unbalance shafts.

In one variant, the second unbalance shaft can in turn have an individual electric motor or be driven by the latter. Therefore, a drive of the second unbalance shaft independently of the first unbalance shaft is possible. Accordingly, the first unbalance shaft can be driven by a belt drive driven by an electric motor or internal combustion engine or driven by an individual integrated electric motor.

The fact that, in this variant, the two unbalance shafts are driven separately from each other, means that it is possible to control the rotation of the two unbalance shafts independently of each other. Therefore, specific vibration patterns can be generated. It is likewise possible to set the directional vector of a resultant vibration in any desired way.

As a result of the compact construction of the electric motor (or of the two electric motors) and the modular design of the exciter housing, various variants can thus be implemented with substantially identical components.

The unbalance exciter according to the invention can advantageously be used in a vibratory plate for ground compaction, wherein the vibratory plate has a drive device for driving the unbalance exciter and, in the case of the first drive type, the drive device has an internal combustion engine or electric motor provided outside the exciter housing of the unbalance exciter, and wherein, in the case of the second drive type, the drive device has the electric motor provided inside the exciter housing of the unbalance exciter.

BRIEF DESCRIPTION OF THE DRAWINGS

These further advantages and features of the invention will be explained in more detail below with reference to examples and with the aid of the accompanying figures, in which.

DETAILED DESCRIPTION

Figure 1:
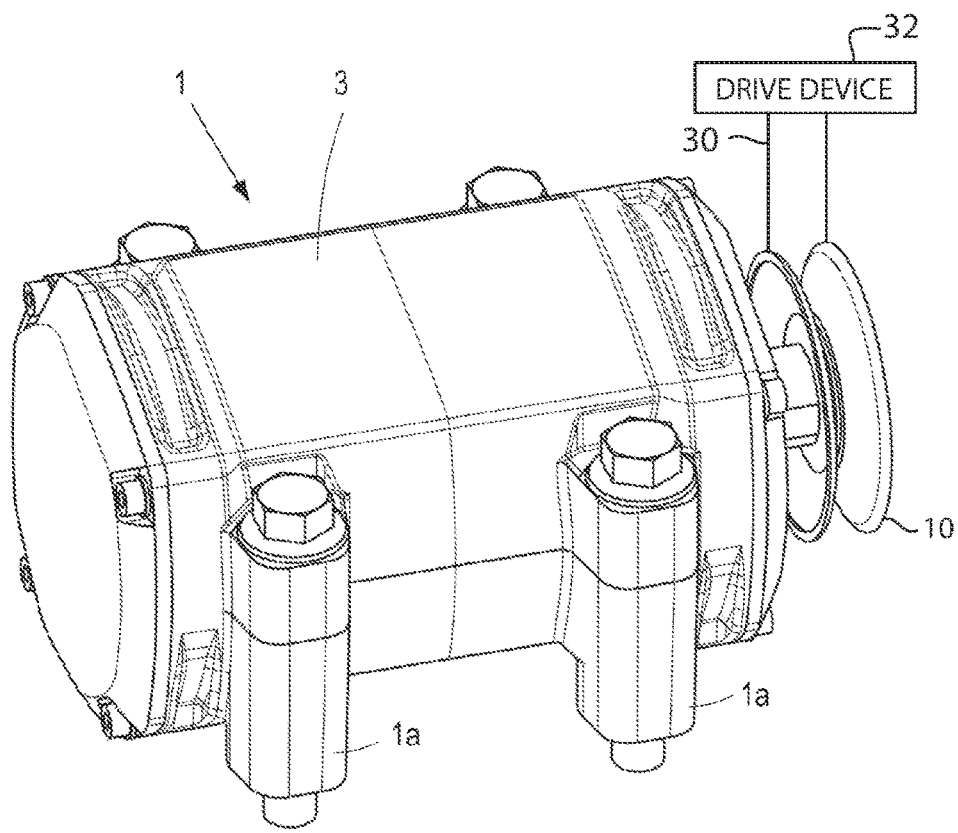
FIG. 1 shows a perspective view of an unbalance exciter for a first drive type by a drive motor provided outside the unbalance exciter.
Figure 2:
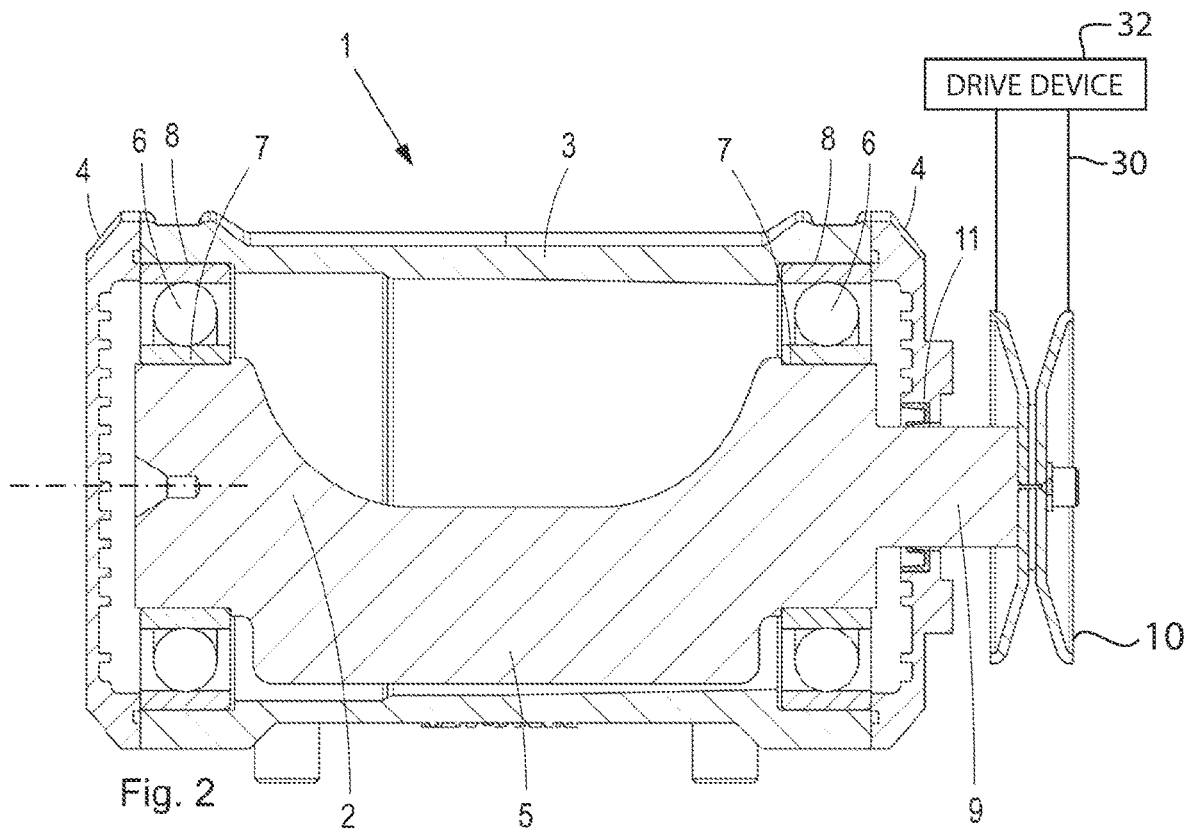
FIG. 2 shows a vertical section through the unbalance exciter from FIG. 1.

FIGS. 1 and 2 show an unbalance exciter for a first drive type in a perspective and sectional illustration.

The unbalance exciter has an exciter housing 1, in which an unbalance shaft 2 is rotatably mounted. The exciter housing 1 can be fixed to a ground contact plate, not shown, by means of screw connections 1a, in order in this way to be able to use the vibrations generated by the unbalance exciter effectively for ground compaction by the ground contact plate.

In a variant not illustrated in the figures, the exciter housing can also be made in one piece or integrally with the ground contact plate. For example, the exciter housing and the ground contact plate can be produced as a casting.

The exciter housing 1 has a central part 3 and two end parts 4 arranged at the ends of the central part 3.

In the variant that is not illustrated, in which the exciter housing is made in one piece with the ground contact plate, the central part of the exciter housing can in particular accordingly be made in one piece with the ground contact plate, for example in the form of an integral casting.

Provided on the unbalance shaft 2 is an unbalance mass 5 which in a known way, during rotation of the unbalance shaft 2 about its central axis or axis of rotation X, generates the desired circumferential unbalance force, which can be used in a vibratory plate for ground compaction.

The unbalance shaft 2 is rotatably mounted in the central part 3 of the exciter housing 1 via two bearings 6. For this purpose, the unbalance shaft 2 has two bearing seats 7. In a corresponding way, two bearing points 8, on which the outer rings of the bearings 6 rest, are provided in the central part.

The bearings 6 can be—as shown in FIG. 2—rolling contact bearings (here: grooved ball bearings), which can be designed in accordance with the strength requirement. Suitable for this purpose are, in particular, the grooved ball bearings shown in FIG. 2, but also cylindrical roller bearings, etc. Alternatively, the bearings 6 can also be formed as sliding bearings.

The unbalance shaft 2 has at one end a shaft extension 9, to the end of which a belt pulley 10 is attached.

The end parts 4 also serve as cover parts, wherein one end part 4 (the left-hand one in FIG. 2) is completely closed, while the other end part 4 (the right-hand one in FIG. 2) has a through hole, through which the shaft extension 9 of the unbalance shaft 2 is guided.

The gap between the end part 4 and the shaft extension 9 is sealed off by a seal 11.

Via the belt pulley 10 and a belt drive 30, the unbalance shaft 2 can be driven by an external drive device 31 or drive motor provided outside the unbalance exciter shown in the figures, in particular one provided outside the exciter housing 1. Instead of the belt pulley 10, another device for introducing torque into the unbalance shaft 2 can also be used.

For example, an internal combustion engine or an electric motor is suitable as a drive motor. The drive by such a drive device provided outside the exciter housing 1 of the unbalance exciter is understood as a first drive type.

Figure 3:
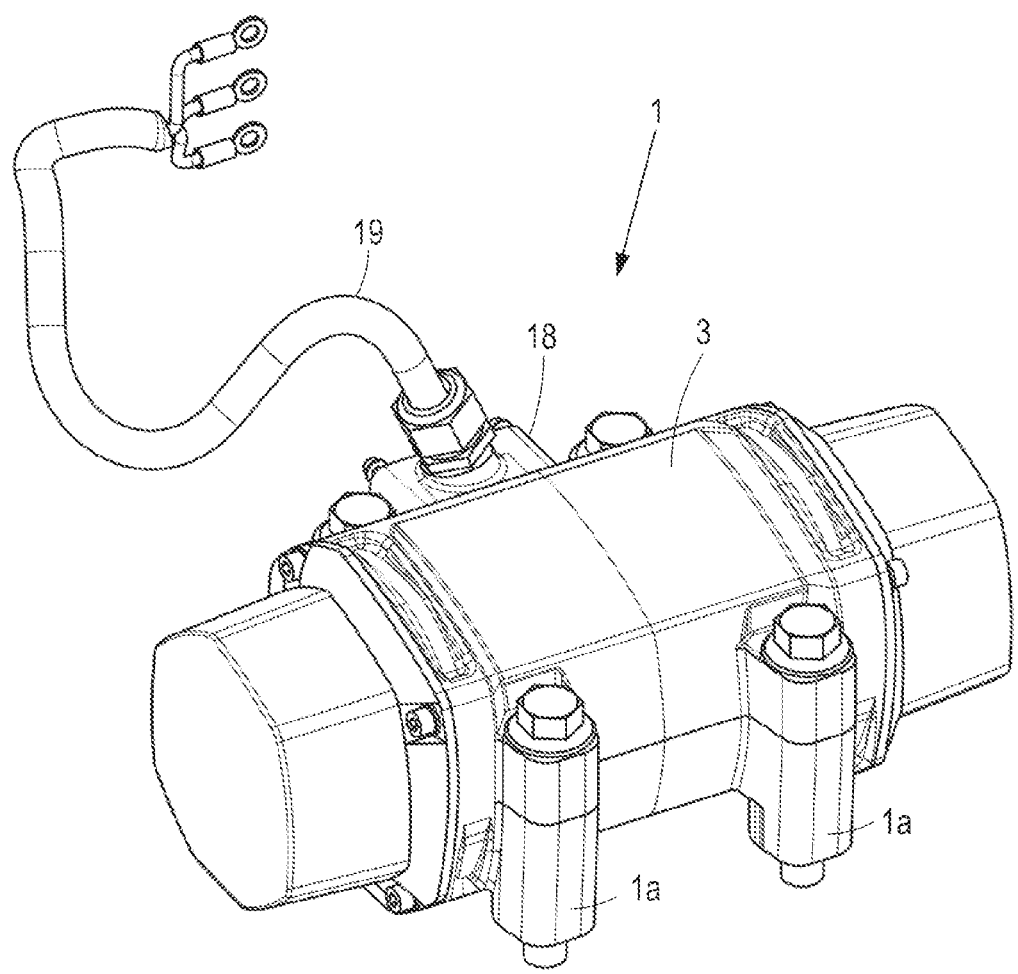
FIG. 3 shows a perspective view of an unbalance exciter according to a second drive type for a drive provided inside the unbalance exciter.
Figure 4:
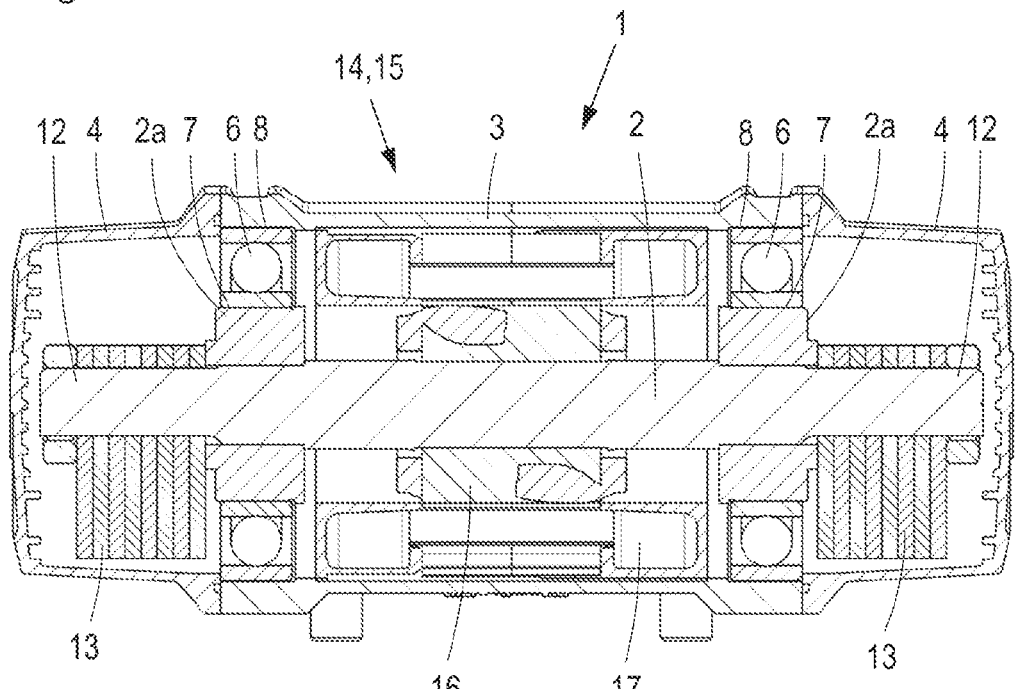
FIG. 4 shows a vertical section through the unbalance exciter from FIG. 3.

FIGS. 3 and 4 show an unbalance exciter for a second drive type in a perspective and sectional illustration. The same or analogous components to those in the embodiment of FIGS. 1 and 2 are designated by the same designations.

In this embodiment, an exciter housing 1 having the central part 3 is likewise provided. The central part 3 is identical to the central part 3 of the embodiment of FIGS. 1 and 2. In addition, the two end parts 4 are used as a part of the exciter housing. While the end parts 4 of the first embodiment have a rather flat shape (FIG. 2), the end parts 4 of the second embodiment (FIG. 4) are curved to be similar to a cap, in order to enclose the unbalance shaft 2. For this purpose, it is possible for the end parts 4 to be identical in the second embodiment. In particular, no end part 4 having a through hole is needed, as is the case in the first embodiment.

Arranged in the interior of the exciter housing 1 is the unbalance shaft 2, in which shaft extensions 12 to each of which partial unbalance masses 13 are attached are present at both ends. The partial unbalance masses 13 can correspond in their overall effect to the unbalance action of the unbalance mass 5 of the first embodiment.

Also part of the unbalance shaft 2 are bearing rings 2a, on which there are the bearing seats 7 for the bearings 6. In this way, the unbalance shaft 2 is also arranged on bearing points 8 in the interior of the central part 3 of the exciter housing 1 in this embodiment. The identical bearing can thus be used in both drive types.

Between the two bearings 6 there is formed a space, which is designated as a central installation space 14, and in which an electric motor 15 is arranged. The electric motor 15 has a rotor 16 and a stator 17. The rotor 16 is fixed to the unbalance shaft 2 in a suitable way, for example by pressing on. The stator 17 is pressed into the recess in the central part 3. In this way, the electric motor 15 with the unbalance shaft 2 can be installed in a very simple way in the interior of the central part 3.

Thus, a variant in which the unbalance exciter can be driven by a drive device provided inside the exciter housing 1 is understood as a second drive type. This drive device in the present case is the electric motor 15.

In addition, a terminal box 18 is provided on the outside of the central part 3 for the connection of an electric feed line 19 for the electric motor 15 in the interior of the exciter housing 1. A hole not shown in the figures is provided in the central part 3 to introduce the electric feed line 19.

Figure 5:
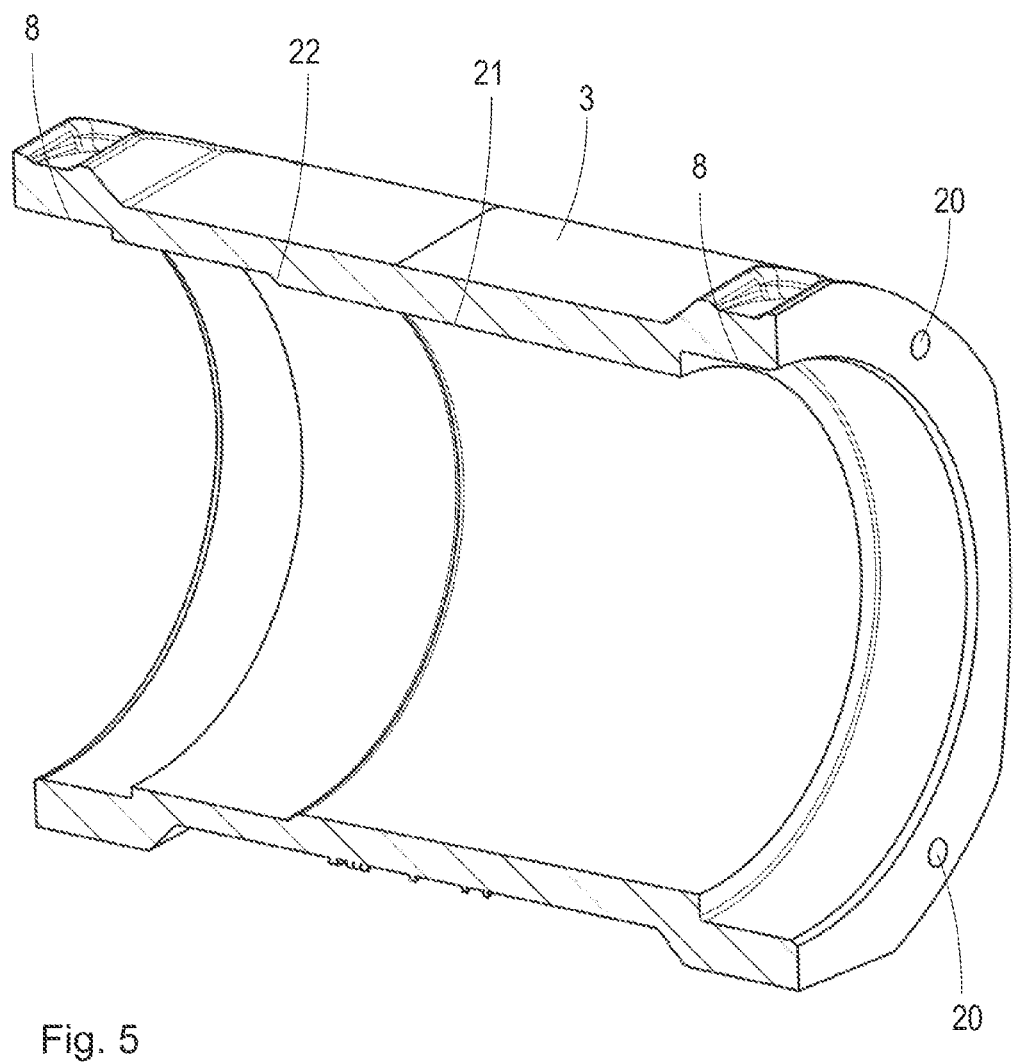
FIG. 5 shows a perspective sectional illustration of a central part of the exciter housing of the unbalance exciter from FIGS. 1 to 4.

FIG. 5 shows the central part 3 in a sectional illustration.

The central part 3 has a substantially hollow-cylindrical recess. Provided at the ends are the bearing points 8, as already explained above.

At the ends, there can additionally be holes 20, to which the end parts 4 can be screwed.

A conical taper 21 with a low slope angle can be formed in the interior of the central part 3, which makes it possible to press the stator 17 (FIG. 4) axially against the conical taper and to clamp it firmly.

To define the pressing position, there is a stop 22, which a pressing tool can strike as the stator 17 is pressed in, in order that the stator 17 assumes the desired axial position in the conical taper 21.

According to the invention, the central part 3 can be used in both variants of the unbalance exciter, that is to say in the first and in the second drive type. This makes it possible to make and stock only one design of a central part 3 for the exciter housing 1 for the production of the unbalance exciter. The multiplicity of parts otherwise required because of the different drive variants can therefore be avoided.

The invention claimed is:

1. An unbalance exciter for a vibratory plate for ground compaction, comprising:
    a rotatably mounted unbalance shaft, on which an unbalance mass is provided to generate an unbalance,
    an exciter housing which at least partly surrounds the unbalance shaft, and
    at least two bearing devices for rotatably mounting the unbalance shaft in the exciter housing; wherein the unbalance shaft has two bearing seats, on each of which one of two bearing devices are provided to support the unbalance shaft; wherein
    the exciter housing has a central part;
    the exciter housing has two end parts arranged at ends of the central part;
    the central part has a hollow-cylindrical recess, in which two bearing points are provided, one for each of the two bearing devices;
    the central part is designed to selectively and alternatively accommodate a first unbalance shaft according to a first unbalance shaft design for a first drive type during a first operation and a second unbalance shaft according to a second unbalance shaft design for a second drive type during a second operation;
    the first unbalance shaft design includes the unbalance mass provided in a central installation spaced formed between the two bearings within the central part of the exciter housing; and
    the second unbalance shaft design includes the unbalance mass provided outside the central installation space;
    the first drive type is provided in which the unbalance exciter can be driven by an external drive device provided outside of the exciter housing of the unbalance exciter; and wherein
    the second drive type is provided in which the unbalance exciter can be driven by an internal drive device provided inside of the exciter housing of the unbalance exciter.

2. The unbalance exciter as claimed in claim 1, wherein
    the first unbalance shaft design has a shaft extension outside the central installation space, via which the first unbalance shaft can be driven by the external drive device provided outside the exciter housing; and wherein
    the second unbalance shaft design includes an electric motor provided inside the central installation space as the internal drive device for the unbalance exciter.

3. The unbalance exciter as claimed in claim 1, wherein, in the first unbalance shaft design, the shaft extension of the unbalance shaft carries a torque transmission device to introduce a drive torque from the external drive device.

4. The unbalance exciter as claimed in claim 1, wherein the unbalance mass includes a plurality of partial unbalance masses; and wherein
    in the second unbalance shaft design, a respective shaft extension, on which a respective partial unbalance mass is arranged, is formed on the unbalance shaft on both end sides thereof.

5. The unbalance exciter as claimed in claim 2, wherein, in the second unbalance shaft design, the electric motor has a rotor which is arranged in a region between the two bearing seats on the unbalance shaft.

6. The unbalance exciter as claimed in claim 2, wherein, in the second unbalance shaft design, the electric motor has a stator which is inserted into the central part in a region between the two bearing points.

7. The unbalance exciter as claimed in claim 1, wherein at least one sub-region having a conical taper is provided in the region of the central part between the two bearing points.

8. The unbalance exciter as claimed in claim 6, wherein the stator can be pressed into the region of the central part between the two bearing points; and wherein
    a mounting stop is provided in the region of the central part between the two bearing points.

9. The unbalance exciter as claimed in claim 6, wherein, in the second drive type, a terminal device is arranged on the outer side of the central part for feeding electric lines to the stator of the electric motor.

10. The unbalance exciter as claimed in claim 1, wherein identical bearing devices are provided for both of the first and second unbalance shaft designs.

11. The unbalance exciter as claimed in claim 1, further comprising at least two or more rotatably mounted unbalance shafts, on each of which an unbalance mass is provided to provide an unbalance; and wherein the unbalance shafts are mounted jointly in the exciter housing.

12. A vibratory plate for ground compaction, comprising:
    an unbalance exciter including:
        a rotatably mounted unbalance shaft, on which an unbalance mass is provided to generate an unbalance, an exciter housing which at least partly surrounds the unbalance shaft, and at least two bearing devices for rotatably mounting of the unbalance shaft in the exciter housing; wherein the unbalance shaft has two bearing seats, on each of which one of two bearing devices are provided to support the unbalance shaft, wherein the exciter housing has a central part, the exciter housing has two end parts arranged at ends of the central part, the central part has a hollow-cylindrical recess, in which two bearing points are provided, one for each of the two bearing devices, the central part is designed to selectively and alternatively accommodate a first unbalance shaft for a first drive type during a first operation and a second unbalance shaft for a second drive type during a second operation, the first unbalance shaft includes the unbalance mass provided in a central installation spaced formed between the two bearing seats within the central part of the exciter housing; and the second unbalance shaft design includes the unbalance mass provided outside the central installation space;

the first drive type is provided in which the unbalance exciter can be driven by an external drive device provided outside of the exciter housing of the unbalance exciter, and wherein the second drive type is provided in which the unbalance exciter can be driven by an internal drive device provided inside of the exciter housing of the unbalance exciter, wherein in the case of the first drive type, the external drive device comprises an internal combustion engine or electric motor provided outside of the exciter housing of the unbalance exciter; and wherein in the case of the second drive type, the internal drive device comprises an electric motor provided inside the exciter housing of the unbalance exciter.

* * * * *